April 5, 1938.    B. E. CLOUGH    2,113,506
LUBRICANT ATOMIZER
Filed Jan. 9, 1937
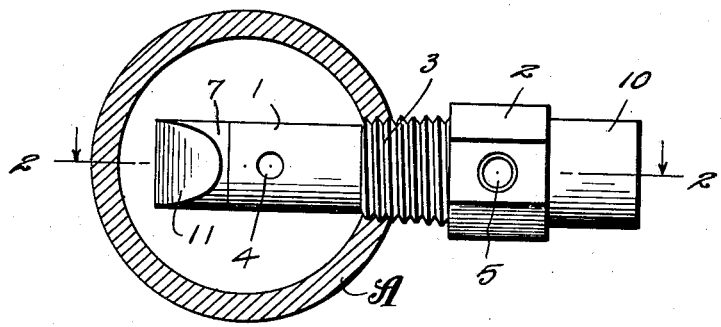
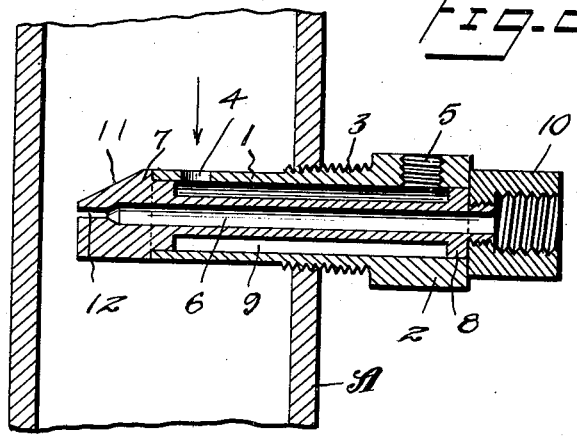
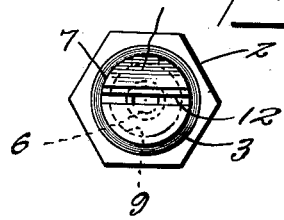
B. E. Clough
INVENTOR
BY Victor J. Evans & Co.
ATTORNEY Patented Apr. 5, 1938

2,113,506

UNITED STATES PATENT OFFICE 2,113,506

LUBRICANT ATOMIZER

Bert E. Clough, Hammond, Ind.

Application January 9, 1937, Serial No. 119,854

2 Claims. (Cl. 184—56)

This invention relates to lubricant atomizers, and its general object is to provide an atomizer for lubricating fuel and steam engines, compressors and the like, that is caused to function only by the flow of fuel etc., through the intake or supply line, to inject lubricant in vapor form therein, to commingle with the fuel, and pressure in the line will in no way effect the operation of the atomizer, therefore the amount of lubricant injected, is controlled solely in accordance, and in direct proportion, with the velocity of the flow, which will of course assure proper and thorough lubrication of the cylinders and valves, regardless of engine speed.

A further object of the invention is to provide a lubricant atomizer, that is easy to install, simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a sectional view taken through the supply line of an engine, air compressor or the like and illustrates the application of my atomizer thereto.

Figure 2 is a sectional view taken approximately on line 2—2 of Figure 1.

Figure 3 is an end view of the atomizer looking in the direction of the nozzle.

Referring to the drawing in detail, the letter A indicates a conduit which may be a steam pipe, or fuel intake pipe of an engine or air intake pipe of an air compressor, as my atomizer will function with equal efficiency with all types of engines and compressors, to inject lubricant within the conduit to commingle with the contents thereof and in accordance with the velocity of the flow of the contents therethrough.

The atomizer includes a tubular shell or casing 1, provided with a head 2 having flat outer faces for the application of a tool for securing the atomizer with respect to the conduit, and formed on the shell exteriorly thereof and tapering inwardly from the head is a threaded portion 3 to be threadedly received in an opening in the conduit, as clearly shown in Figure 1. The shell acts as a body for the atomizer and is provided with open ends, as well as an opening 4 adjacent to one end thereof, and a threaded opening 5 within the head 2, both of the openings communicating with the interior of the shell and which are for a purpose which will be later described.

The core of the atomizer includes an intermediate tubular portion 6 having a nozzle head 7 formed on one end and is provided with a threaded opposite end, with a bearing collar 8 inwardly of the threaded opposite end for cooperation with a shouldered portion of the nozzle head to receive the shell or casing 1, and so as to provide a chamber 9 about the intermediate tubular portion 6, as clearly shown in Figure 2.

The bore of the tubular portion 6 extends through the nozzle head 7, as well as through the threaded portion and the latter has threadedly secured thereto a nipple fitting 10, which not only acts to secure the core within the shell but is adapted to receive one end of a pipe line, not shown, to provide communication between the nozzle and a suitable source of lubricant supply, such as a reservoir or the like.

The nozzle head has a beveled face 11 for disposal uppermost as shown in Figures 1 and 2, so as to be in the path of the flow of the fuel or the like through the conduit A and a transverse kerf extends in and across the outer end of the nozzle head for communication with the bore of the core, to provide an outlet for the lubricant, as will be apparent upon inspection of Figure 2.

A pipe line, not shown from the source of lubricant supply is secured in the threaded opening 5, and communicates with the source at the upper end thereof, while the pipe line that extends to the nipple fitting 10 communicates with the source at its lower end, so that the lubricant will flow to the atomizer through the latter pipe line.

In the use of my atomizer it is secured within the conduit A as best shown in Figure 2, which illustrates the fact that the opening 4 as well as the beveled face 11 is disposed uppermost, and by such arrangement, it will be obvious that they are arranged in the path of the flow of the contents of the conduit, the flow being indicated by the arrow in Figure 2, therefore the passage of the contents over the beveled face and by the kerf creates a partial vacuum in the chamber 6, and a portion of the contents passes into the chamber 9 through the opening 4, which sets up a pressure within the chamber 9 to assist the partial vacuum in forcing the lubricant from its source and through the chamber 6 and the nozzle head of the atomizer. The contents of the conduit that is diverted by the beveled face passes over the kerf and tends to draw a thin layer of lubricant from the kerf and converts the same into a fine vapor to commingle with the contents, with the result it will be seen that the amount of lubricant injected into the conduit is controlled in direct proportion with the velocity of the flow of its contents therethrough, thereby assuring proper and thorough lubrication regardless of engine speed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A lubricant atomizer for disposal in the intake conduit of an engine or the like, and comprising a hollow elongated body, a flat faced head on the outer end of the body, and having an opening therein for communication with a source of lubricant supply, the inner end of the body having an opening therein disposed in the path of the flow of the contents of the conduit, a tubular core within the body and providing a chamber therein having the openings in communication therewith, means on the outer end of the core for disposal in communication with said source, a nozzle on the opposite end of the core and cooperating with said means for securing the core within the body, a beveled face on the nozzle for disposal in the path of the flow, and said nozzle having a transverse kerf below the beveled face.

2. A lubricant atomizer comprising a hollow elongated body, a head on one end of the body and having flat faces with a threaded opening in one of said faces, said body being exteriorly threaded for securing the atomizer in position for use, and having an opening therein adjacent its opposite end, a core within and extending through the body, a tubular portion included in the core and spaced from the wall of the body to provide a chamber having the openings in communication therewith, a nipple fitting threadedly secured to one end of the core, a nozzle head on the opposite end of the core with the bore of the tubular portion extending therein, a beveled face on the nozzle head and said nozzle head having a kerf extending across the transverse center thereof and intersecting the bore.

BERT E. CLOUGH.